US012060082B1

(12) United States Patent
Garimella et al.

(10) Patent No.: US 12,060,082 B1
(45) Date of Patent: Aug. 13, 2024

(54) MACHINE LEARNED INTERACTION PREDICTION FROM TOP-DOWN REPRESENTATION

(71) Applicant: Zoox, Inc., Foster City, CA (US)

(72) Inventors: Gowtham Garimella, Burlingame, CA (US); Jefferson Bradfield Packer, San Francisco, CA (US); Aaron Huang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 556 days.

(21) Appl. No.: 17/121,041

(22) Filed: Dec. 14, 2020

(51) Int. Cl.
*B60W 60/00* (2020.01)
*B60W 30/18* (2012.01)
*G06F 18/214* (2023.01)
*G06F 18/2415* (2023.01)
*G06N 20/00* (2019.01)
*B60W 50/00* (2006.01)

(52) U.S. Cl.
CPC .. *B60W 60/0027* (2020.02); *B60W 30/18159* (2020.02); *B60W 30/18163* (2013.01); *G06F 18/214* (2023.01); *G06F 18/2415* (2023.01); *G06N 20/00* (2019.01); *B60W 2050/0075* (2013.01); *B60W 2554/80* (2020.02); *B60W 2556/45* (2020.02)

(58) Field of Classification Search
CPC ....... B60W 60/0027; B60W 30/18159; B60W 30/18163; B60W 2050/0075; B60W 2554/80; B60W 2556/45; G06F 18/214; G06F 18/2415; G06N 20/00
See application file for complete search history.

(56) References Cited

U.S. PATENT DOCUMENTS

| 10,421,453 | B1* | 9/2019 | Ferguson | B60W 30/18154 |
| 11,562,181 | B2* | 1/2023 | Chen | G06V 30/19173 |
| 2018/0018524 | A1* | 1/2018 | Yao | G06V 20/56 |
| 2018/0136000 | A1* | 5/2018 | Rasmusson, Jr. | G05D 1/0212 |
| 2019/0064840 | A1* | 2/2019 | Becker | G05D 1/0248 |
| 2019/0156128 | A1* | 5/2019 | Zhang | G08G 1/167 |
| 2019/0234751 | A1* | 8/2019 | Takhirov | G01C 21/3461 |
| 2020/0004259 | A1* | 1/2020 | Gulino | G05D 1/024 |
| 2020/0026282 | A1* | 1/2020 | Choe | G06T 7/50 |
| 2020/0150665 | A1* | 5/2020 | Refaat | G05D 1/0088 |
| 2020/0159225 | A1* | 5/2020 | Zeng | G05D 1/0212 |
| 2020/0174481 | A1* | 6/2020 | Van Heukelom | G06N 3/045 |

(Continued)

*Primary Examiner* — Peter D Nolan
*Assistant Examiner* — Peter Y Ning
(74) *Attorney, Agent, or Firm* — Lee & Hayes, P.C.

(57) ABSTRACT

Techniques are discussed for interaction probabilities associated with regions of an environment around a vehicle. An interaction probability of a region may indicate a likelihood an object positioned at the region will interact with the vehicle. A top-down multi-channel image representing a top-down view of the environment and objects therein may be generated and input to a machine learned (ML) model. The ML model may output a probability map, a portion of the probability map comprising a region and an interaction probability associated with the region that indicates a likelihood objects positioned at the region will interact with the vehicle. A priority for resource assignment or analysis may be determined based on the interaction probability for an object positioned in the region. Control of the vehicle may be performed based at least in part on the priority for resource assignment or analysis.

20 Claims, 5 Drawing Sheets

(56) References Cited

U.S. PATENT DOCUMENTS

| | | | | |
|---|---|---|---|---|
| 2020/0191914 | A1* | 6/2020 | Kunz | G05D 1/0088 |
| 2020/0202145 | A1* | 6/2020 | Mao | G05D 1/0088 |
| 2020/0207375 | A1* | 7/2020 | Mehta | B60W 60/00274 |
| 2020/0324795 | A1* | 10/2020 | Bojarski | G01C 21/3602 |
| 2021/0081715 | A1* | 3/2021 | Rosman | B60W 50/06 |
| 2021/0150752 | A1* | 5/2021 | Ayvaci | G06V 20/58 |
| 2021/0197813 | A1* | 7/2021 | Houston | B60W 30/143 |
| 2021/0295171 | A1* | 9/2021 | Kamenev | G06T 7/70 |
| 2021/0326651 | A1* | 10/2021 | Northcutt | G06V 10/7747 |
| 2021/0406559 | A1* | 12/2021 | Efland | G06V 10/803 |
| 2022/0169278 | A1* | 6/2022 | Refaat | B60W 60/0011 |

* cited by examiner

100

```
┌─────────────────────┐
│ RECEIVE SENSOR DATA │
│    OF AN            │         ● ● ●
│  ENVIRONMENT        │
│      102            │
└─────────────────────┘
          │
          ▼
┌─────────────────────┐
│ GENERATE, BASED AT  │
│ LEAST IN PART ON    │
│ THE SENSOR DATA,    │
│ MULTI-CHANNEL       │         ● ● ●
│ IMAGE(S)            │
│ REPRESENTING A      │
│ TOP-DOWN VIEW OF    │
│ THE ENVIRONMENT     │
│      108            │
└─────────────────────┘
          │
          ▼
┌─────────────────────┐
│ INPUT THE MULTI-    │
│ CHANNEL IMAGE(S)    │         ● ● ●
│ TO A MACHINE        │
│ LEARNED MODEL       │
│      120            │
└─────────────────────┘
          │
          ▼
┌─────────────────────┐
│ RECEIVE, FROM THE   │
│ MACHINE LEARNED     │
│ MODEL, INTERACTION  │
│ PROBABILIT(IES)     │
│ ASSOCIATED WITH     │
│ REGIONS AROUND      │         ● ● ●
│ AUTONOMOUS VEHICLE  │
│ AND DETERMINE       │
│ INTERACTION         │
│ PROBABILITIES FOR   │
│ OBJECTS BASED ON    │
│ THE INTERACTION     │
│ PROBABILIITIES OF   │
│ ASSOCIATED REGIONS  │
│      126            │
└─────────────────────┘
```

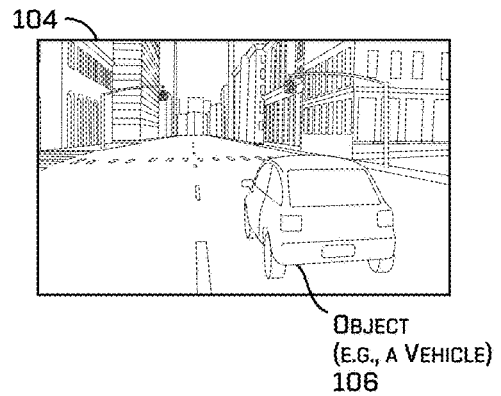
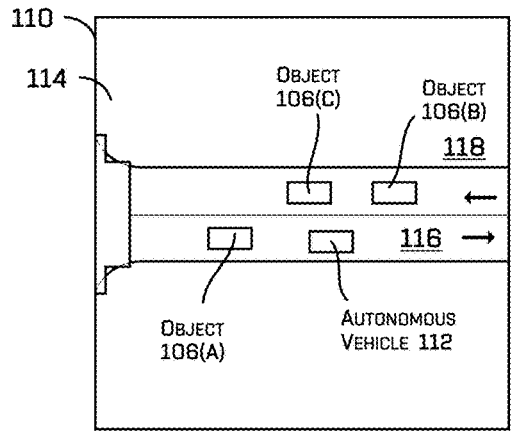
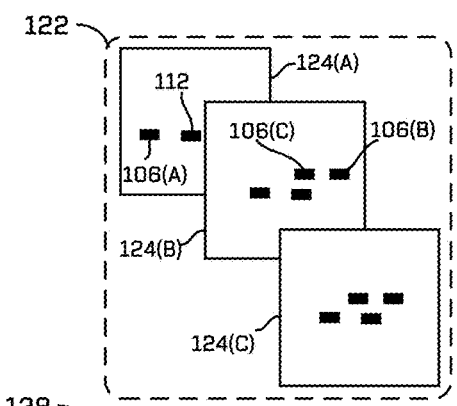
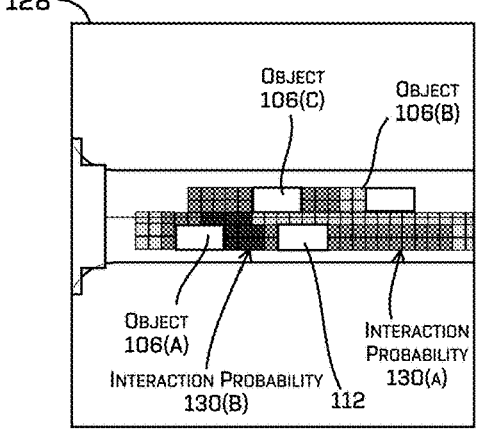

FIG. 1

MACHINE LEARNED INTERACTION PREDICTION FROM TOP-DOWN REPRESENTATION

BACKGROUND

Prediction systems in vehicles, e.g., autonomous vehicles, use information associated with objects in an environment (e.g., dynamic objects, static objects) and drivable surface information (e.g., extents of the drivable surface, lanes in the drivable surface, directions-of-travel) to determine actions for navigating through the environment. However, in more complex driving environments, e.g., in which multiple objects may impact travel (which may comprise secondary, tertiary, and more remote interactions with a vehicle), it may be difficult to determine accurate commands for the vehicle to traverse the environment. For instance, as the vehicle considers more objects, the cost of computation increases, which can impact decision making at the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a pictorial flow diagram of an example process for generating a probability map associated with interaction probabilities for regions of an environment, in accordance with embodiments of the disclosure.

DETAILED DESCRIPTION

Figure 2A:
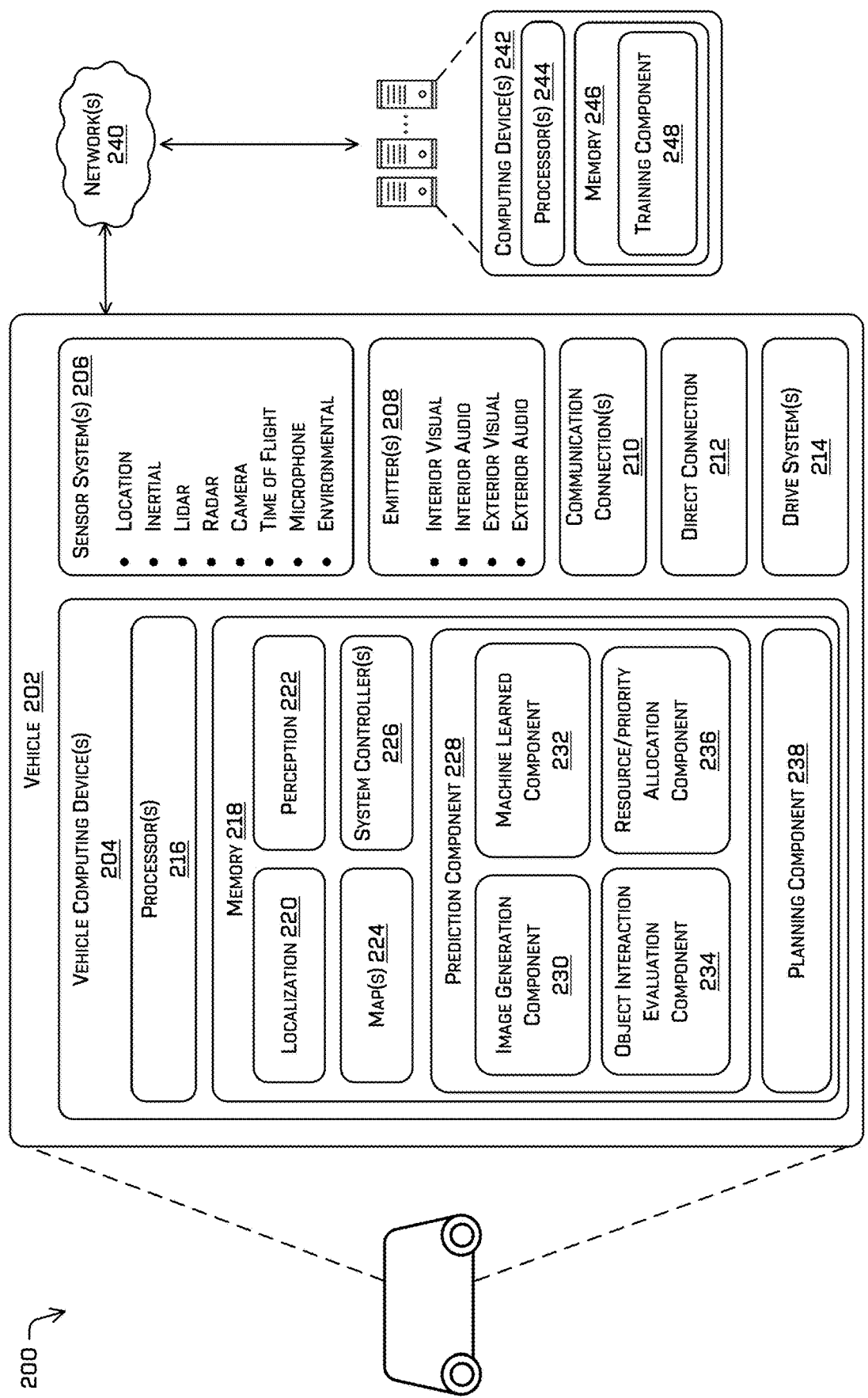
FIG. 2A depicts a block diagram of an example system for implementing the techniques described herein, in accordance with embodiments of the disclosure.

Techniques described herein are directed to control of a vehicle, such as an autonomous vehicle, in an environment. In some such techniques, object interactions may be predicted for performing control of an autonomous vehicle. For example, in implementations described herein, a control (such as an acceleration, steering angle, torque, etc.) of a vehicle along a planned path relative to a number of objects in the environment (e.g., other vehicles on the road) may be determined using interaction probabilities indicative of a likelihood that the objects will interact with the autonomous vehicle and/or with each other. For example, using the interaction probabilities, a computing system associated with the vehicle can more readily identify objects that are relevant to the vehicle's travel and/or more efficiently allocate resources to modelling behaviors of, or determine which behaviors to model of the vehicle and/or the objects (e.g., incorporating information on how the one or more objects may react to one another in an environment). Further, complex interactions between the entities and/or the vehicle may otherwise be difficult to model and require significant computational resources to determine.

As a non-limiting example, a computing device of an autonomous vehicle may receive sensor data, e.g., from a sensor on the vehicle, indicative of positions of objects such as additional vehicles on the road, e.g., relative to the vehicle. The computing device may also receive map data of the surrounding environment. A multi-channel image (which may be referred to throughout as simply an image) encoding various parameters of the object(s) and/or of the environment in a top-down view can be generated based on the sensor data and/or map data. Sensor data can be used to generate one or more channels (e.g., distinct portions of data) of the multi-channel input (otherwise referred to herein as an image) representing a bounding box and velocity information associated with the object, map data, and other semantic information (e.g., speed limits, lane widths, lane ends, stop lines, traffic lights, traffic light states, and the like).

Multiple "images" can be generated representing the environment over time and input into a machine learned model configured to output interaction probabilities associated with regions of the environment (e.g., in the form of a probability map). In some examples, the interaction probabilities associated with the regions may be indicative of the likelihood an object positioned in the region will interact with the autonomous vehicle or another entity in the environment. For example, the computing device of the autonomous vehicle may determine one or more regions associated with an object (e.g., a region in which a centroid of the object is positioned) and assign an interaction probability of the determined region to the object. Alternatively, a combination of interaction probabilities associated with one or more regions the object resides in (or will reside in over a period of time) may be used to calculate an aggregate interaction probability for the object (e.g., as a weighted average or sum that is weighted by a portion of the object overlapping the regions). Other variations on assignment of an interaction probability to objects based on the regions associated with objects by location are contemplated. In at least some examples, the output may further comprise a classification of a type of interaction as discussed in detail below.

The computing device can utilize the interaction probabilities and/or classifications associated with the regions in which objects are positioned to more efficiently (e.g., more quickly and/or with reduced computing resources) predict object behaviors, model vehicle planning, and/or generate vehicle controls. For example, additional or reduced processing resources may be assigned to, or priority of assignment thereof may be determined for, objects. Additionally or alternative, a determination of which analyses to perform for objects may be based at least in part on the interaction probabilities.

In some examples, sensor data captured by the vehicle can include lidar data, radar data, image data, time of flight data, sonar data, and the like. In some cases, the sensor data can be provided to a perception system configured to determine a type of an object (e.g., vehicle, pedestrian, bicycle, animal, parked car, tree, building, and the like) in the environment. Further, the perception system can determine, based on the sensor data, movement information about the object in the environment. A top-down view (e.g., a top-down representation encoded in an image-like format) of the environment may be generated based on the sensor data and any data based on the sensor data. For example, the image can represent the object as a two-dimensional bounding box representing the location of the object in the environment as well as an extent of the object (e.g., the length and width of the object), and/or a classification of the object (e.g., vehicle, pedestrian, and the like). Movement information such as velocity information can be represented as a velocity vector associated with the bounding box, although other representations are contemplated. Additionally, the image can represent, but is not limited to, one or more of: road network information (e.g., semantic labels indicating lanes, crosswalks, stop lines, lane dividers, stop signs, intersections, traffic lights, and the like), traffic light status (e.g., red light, yellow light, green light, etc.), a bounding box associated with the object, a velocity of the object in an x-direction and a y-direction, an acceleration of the object in an x-direction and a y-direction, a blinker status of the object (e.g., left-turn, right-turn, braking, reverse, hazards, no lights, etc.), and the like. In various examples, such additional representations may be provided as separate and distinct channels of data.

A machine learned model may generate interaction probabilities as a probability map representing regions of the environment. For example, a probability map can represent a 64×64 grid (or J×K sized grid) representing a 100 meter by 100 meter area around the vehicle. Of course, the probability map can represent any size of area and can represent any number of discrete portions of the area. That is, the probability map can represent an environment at any level of resolution. In some cases, a portion of the probability map can be referred to as a region or cell of the probability map representing a discrete portion of the area. Each region can comprise an interaction probability representing a probability that an object at the corresponding location in the environment at the time corresponding to the probability map will interact with the vehicle (and/or, in some cases, other agents). In some instances, the machine learned model can output a plurality of probability maps, wherein a probability map of the plurality of probability maps can represent interaction probabilities associated with the region at a particular time in the future (e.g., 0.5 second, 1 second, 3 seconds, 5 seconds, 10 seconds, etc.). In some examples, the probability map may be a discretized probability map. In the various examples, one or more interaction classifications may be associated with the one or more cells. Probabilities of interaction may be determined in any of the examples above by performing a sum (which may be normalized) of the elements through which the object and/or the vehicle pass as represented in the output.

In some examples, the image data representing the environment can be input to a machine learned model trained to output one or more "heat maps" comprising interaction probabilities associated with region of the environment. A heat map may be a probability map over the represented area in which the regions are approximately or substantially scaled to a pixel (or an L×M grid of pixels) of the top-down image(s). As such, each pixel (e.g., or L×M grid of pixels) of the heat map may correspond to a respective pixel (e.g., or L×M grid of pixels) in the top-down image(s). Each pixel can comprise an interaction probability representing a probability that an object at the location in the environment corresponding to the pixel will interact with the vehicle. In some examples, a probability map can generally refer to an interaction probability map or a heat map of interaction probabilities, as discussed herein.

In some examples, the machine learned model may be trained to receive one or more top-down views of the area around the vehicle (e.g., which may represent the environment around the vehicle over time) and output a probability map of interaction probabilities as discussed above. The training data used to train the machine learned model can comprise data captured by a vehicle as it traverses through an environment, map data, and/or other data. Using the probability map output by the machine learned model being trained, interaction probabilities may be assigned to objects in the training data. The interaction probabilities may be compared to ground truth data to determine a loss. In some examples, ground truth data may indicate that an object is an interacting object when the object and the vehicle occupy the same spatial position (e.g., within a threshold distance) within a threshold time period. In particular, an example may determine a ground truth interaction exists for an object where the vehicle occupies a position noted by coordinates $(x_0, y_0)$ in the environment at time $t_0$ and the object occupies a position noted by coordinates $(x_1, y_1)$ where $x_1=x_0 \pm 1$ meter and $y_1=y_0 \pm 1$ meter at time $t_1$ where $t_1=t_0 \pm 8$ seconds. Stated differently, the ground truth may indicate a ground truth interaction exists when the object occupies a location at a time within one meter of a position occupied by the vehicle within a time period from eight seconds before the time $t_0$ eight seconds after the time. Depending on the example, the ground truth interaction data may be a yes or no type value or may have more than two possible values. For examples, the ground truth interaction data for an object may be determined based on how close in time and position the interaction occurred (e.g., an object that crossed the same position three seconds earlier than the vehicle may have a higher ground truth interaction than an object crossing 0.5 meters away from the vehicle's path at a time five seconds later). A loss may be determined based on the agreement or disagreement between the interaction probabilities assigned to the objects and the ground truth interactions. This loss may then be backpropagated to train the machine learned model. In various examples, such a loss may comprise a cross-entropy loss, though any other loss is contemplated.

In some examples, training data used to train the machine learned model can comprise categories or mixes of ground truth interaction. For example, the training data may include leading, following and lane change ground truth interactions (or classifications). A leading interaction may be an interaction in which the object occupies, or is within a threshold distance of, a position occupied by the vehicle within a threshold time period before the object. A following interaction may be an interaction in which the vehicle occupies, or is within a threshold distance of, a position occupied by the object within a threshold time period before the vehicle. A lane change interaction may be an interaction in which an object changes from or to the lane in which the vehicle is traveling. In some examples, the machine learned model may be trained using ground truth data including a specified mix of interaction categories. Further, the training of the ML model may include different weights for different categories of interactions. Moreover, the training of the ML model may provide different weights for non-interacting objects in training data (e.g., for correcting false positives) from the weights for interacting objects.

In various examples, the machine learned model may output interaction classification(s) for objects associated with the regions. The computing device of the autonomous vehicle may determine one or more regions associated with an object (e.g., a region in which a centroid of the object is positioned) and assign an interaction classification of the determined region to the object. As a non-limiting example, where the object continues ahead of the vehicle, such an object may be labeled (provided the classification of) a leading object. Other interaction classifications include, but are not limited to, lane change, stopping, crossing intersection, slowing down, reversing, pulling out (e.g., from a parking lane/spot), or the like. In some examples, ground truth data used in training the machine learned model may include interaction classification(s) (e.g., based determined based on observed behavior in log data (whether of real or simulated data). In training, a loss may be determined based on the agreement or disagreement between the interaction classifications assigned to the objects and the ground truth data. Losses associated with the classifications may comprise a cross-entropy loss, though any other loss is contemplated.

By identifying relationships of objects, the techniques described herein may generate more realistic predictions of objects that can affect the vehicle's travel. As a non-limiting example, consider two vehicles following one another. In such an example, by modeling vehicle behavior based on one vehicle following the other, additional constraints may be placed on the following vehicle (e.g., can have a maximum velocity of the lead vehicle, is limited based on a distance to the lead vehicle, etc.). Such unique object relationship determination techniques may provide for improved control with respect to objects, as opposed to conventional systems. The techniques described herein may result in a smoother ride for passengers, lawful operation, and increased safety for the autonomous vehicle and/or objects in the environment. As a non-limiting example, if output associated with the object is indicative of a "leading" interaction, additional processes may be dedicated to such types of interactions while others are not used, thereby optimizing resources for interacting with a leading object.

Techniques described herein may provide a technological improvement over existing prediction and navigation technology. In addition to improving the accuracy with which sensor data can be used to determine object locations in the environment (e.g., due to more effective allocation of processing resources and/or a reduction in a number of superfluous analyses being performed), techniques described herein can provide a smoother ride and improve safety outcomes by, for example, more accurately determining safe driving maneuvers to be implemented by the vehicle to reach an intended destination. Techniques described herein may also reduce component wear and energy requirements associated with the vehicle. For example, existing techniques may more harshly brake and/or accelerate, putting additional and unnecessary stress on vehicle components. Further, techniques described herein may improve the functioning of a computer by minimizing the amount of computational resources required to control a vehicle in response to other entities in an environment, as well as improve the safe operation of the vehicle by expending those limited resource on only those objects which may interact with the vehicle.

FIG. 1 is a pictorial flow diagram of an example process 100 for generating a probability map associated with interaction probabilities for regions of an environment in accordance with embodiments of the disclosure. More particularly, a machine learned model may be utilized to determine interaction probabilities for regions of an area around a vehicle. An interaction probability may indicate a likelihood an object at the corresponding region in the area will interact with the vehicle (e.g., how likely the object is to be relevant to prediction and planning operations performed by the vehicle).

At operation 102, the process can include capturing sensor data of an environment. In some examples, the sensor data can be captured by one or more sensors on a vehicle (autonomous or otherwise). For example, the sensor data can include data captured by one or more of a lidar sensor, a radar sensor, an image sensor, a time-of-flight sensor, a sonar sensor, and the like.

Example sensor data 104 may be captured at operation 102. For example, sensor data 104 can represent an environment and may include one or more object(s) 106. In some examples, the object 106 can represent a vehicle, a pedestrian, an animal, and the like. Though one object 106 is shown for ease of illustration and to aid reproducibility, it should be understood that the sensor data may include multiple objects 106.

For the purpose of discussion, the vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle are described throughout this disclosure.

At operation 108, the process can include generating, based at least in part on the sensor data and map data, multi-channel image(s) representing a top-down view of the environment. An example 110 illustrates an environment based on the sensor data 104 and map data 114 including drivable areas 116 and non-drivable areas 118, the vehicle 112 traveling on a road of the drivable area 116 (e.g., which may be the vehicle that captured the sensor data 104), and a number of additional objects 106(A)-106(C). Specifically, the additional objects 106(A)-106(C) of the example 110 are additional vehicles also traveling on the road. Although FIG. 1 illustrates only the additional vehicles as objects 106 traveling on the road, many other types of objects, including, but not limited to, buses, bicyclists, pedestrians, motorcyclists, or the like may also or alternatively be traveling on the road. In some examples, the drivable region 116 can include any area of an environment where the vehicle 112 may (legally) traverse (e.g., a road, a driveway, a parking lot, etc.). In some examples, the non-drivable region 118 may represent areas of an environment where the vehicle 112 cannot legally or physically traverse (e.g., a sidewalk, a building, a park, etc.).

In some examples, the operation 108 can include accessing map data associated with the environment. For example, map data can comprise map elements such as lane element indicating a region of the environment corresponding to the drivable region 116. Additional examples of map elements can include, but are not limited to, one or more of a crosswalk element, a bike lane element, an intersection element, a lane divider element, a traffic light element, a stop sign element, a stop line element, a yield sign element, a yield line element, a parking lane element, a driveway element, a speed bump element, jay walking regions (e.g., a virtual crosswalk), trajectory waypoints (e.g., known trajectories), passenger pickup points, a sign location element, a geofence element, and the like.

In some instances, the sensor data 104 captured in the operation 102 can be used to determine information about the object 106, including but not limited to, a type of the object (e.g., semantic information indicating a classification of the object, such as a vehicle, pedestrian, bicycle, animal, and the like). In some instances, the operations can include determining the type of the object 106, a bounding box associated with the object 106, and/or movement information associated with the object, as discussed herein.

Multi-channel image(s), such as example 110, may include one or more channels representing a bounding box locations, extents (e.g., length and width), and velocity information associated with the object(s), map data, and other semantic information (e.g., speed limits, lane widths, lane ends, stop lines, traffic lights, traffic light states, and the like). In some examples, the channels may include other information such as velocity and/or predicted action information (e.g., a yield action or braking action). Various channels may be determined for type of data, type of information, or the like and combined to form a multi-channel image.

As can be understood, the operation 108 can include generating or determining the multi-channel image(s), as discussed herein. Examples of generating or determining multi-channel image(s) are discussed in connection with U.S. patent application Ser. No. 16/151,607, entitled "Trajectory Prediction on Top-Down Scenes," and filed Oct. 4, 2018. Application Ser. No. 16/151,607 is herein incorporated by reference, in its entirety and for all purposes.

At operation 120, the process can include inputting the multi-channel image(s) 122 to a machine learned model. An example of such multi-channel image(s) is illustrated in example 122.

The example 122 represents a plurality of multi-channel images associated with a top-down view around the vehicle 112 over a period of time. For instance, the example 122 comprises a first multi-channel image 124(A) (e.g., 4 seconds before current time), a second multi-channel image 124(B) (e.g., 2 seconds before current time), and a third multi-channel image 124(C) (e.g., the current time). Though top-down views are shown above for three times at two second intervals, any numbers of views may be used at the same or other time intervals (e.g., five top-down views at two second intervals, ten views at 1.5 second intervals, a single top-down view, etc.).

In some examples, the process can include inputting such image(s) to one or more machine learned models trained to output one or more probability maps (e.g., heat maps) based on the top-down images input into the machine learned model.

At operation 126, the process may include receiving, from the machine learned model and based on the multi-channel image(s), interaction probabilit(ies) associated with regions around the autonomous vehicle and determining interaction probabilities for objects based on the interaction probabilit(ies) of regions in which the objects are positioned and/or interaction classifications associated therewith.

In some instances, operation 126 can include generating or determining a probability map (or, specifically, a heat map) representing interaction probabilities indicative of the likelihood an object at the corresponding region in the area will interact with the vehicle. In some instances, a probability map (e.g., a interaction probability map, a heat map, and the like) may represent (e.g., from a top-down perspective of the environment) interaction probabilities for regions of an area around the vehicle 112 in the environment. The interaction probabilities may be indicative of a likelihood an object at the corresponding region in the area will interact with the vehicle (e.g., how likely the object is to be relevant to prediction and planning operations performed by the vehicle).

In some examples, the machine learned model may also output interaction classification(s) for regions of the probability map. As a non-limiting example, where the object continues ahead of the vehicle, such an object may be labeled (provided the classification of) a leading object. Other interaction classifications include, but are not limited to, lane change, stopping, crossing intersection, slowing down, reversing, pulling out (e.g., from a parking lane/spot), or the like.

In some examples, a machine learned model may be trained to generate any number of probability maps based on any number of input images (e.g., heat maps). For example, the machine learned model may receive N number of input images and can output O number of probability maps. In some examples, the probability maps may be generated as heat maps. Examples of generating one or more heat maps are discussed in U.S. patent application Ser. No. 16/151,607, filed Oct. 4, 2018. Application Ser. No. 16/151,607 is herein incorporated by reference, in its entirety and for all purposes.

An example 128 illustrates a plurality of interaction probabilities 130 associated with the regions of the area. For the purposes of illustration, a color (or degree of darkness) of a region can represent a probability associated with the region that an object 106 at the corresponding region in the area will interact with the vehicle 112 or otherwise indicate how likely the object is to be relevant to prediction and planning operations performed by the vehicle 112. For example, a white color may illustrate a low probability, a light gray color (e.g., such as shown for interaction probability 130(A)) may illustrate a low probability, a dark gray color may illustrate a medium probability, and a black color (e.g., such as shown for interaction probability 130(B)) may illustrate a high probability. Of course, the example 128 is illustrative and, while regions with white coloration are not shown with borders, each region in the area can be associated with an individual interaction probability value.

As mentioned, operation 126 may further include determining interaction probabilities for objects based on the interaction probabilities of regions in which the objects are positioned. For example, the operation 126 may include determining the position of a centroid of, for example, object 106(C). Then, the region including the position of the centroid of the object 106(C) may be determined (e.g., object 106(C) is illustrated as located in a portion of the area having dark grey coloration indicating a medium probability). The interaction probability 130 of the determined region may then be assigned to the object 106(C). In other examples, such a probability may be determined by performing an integration over the portion associated with the object and/or vehicle for an instance in time and/or over a period of time. In such examples, the probabilities may be normalized. In examples in which the machine learned model outputs interaction classification(s) for regions of the probability map, the interaction classification of the determined region(s) may also be assigned to the object.

In some examples, the interaction probabilities assigned to the objects 106 may be used to more efficiently (e.g., more quickly and/or with reduced computing resources) predict object behaviors, model vehicle planning, and/or generate vehicle controls. For example, additional processing or analyses may be performed for objects with higher interaction probabilities. In some examples, the additional processing may include performing following logic, leading logic, lane change logic, active prediction, and so on. Examples of such additional processing may be performed as discussed in connection with U.S. patent application Ser. No. 16/181,164, filed Nov. 5, 2018, U.S. patent application Ser. No. 16/151,607, filed Oct. 4, 2018 and U.S. patent application Ser. No. 16/440,793, filed Jun. 13, 2019. Application Ser. Nos. 16/181,164, 16/151,607 and 16/440,793 are herein incorporated by reference, in their entirety and for all purposes.

In some examples, the additional processing may be performed using machine learned model or procedural algorithms. Similarly, less processing or analyses may be performed for objects with lower interaction probabilities. In some examples, some or all analyses may be forgone for objects having interaction probabilities below a threshold level.

FIG. 2A depicts a block diagram of an example system 200 for implementing the techniques described herein. In at least one example, the system 200 can include a vehicle 202.

The vehicle 202 can include one or more vehicle computing devices 204 (also referred to as a vehicle computing device 204 or vehicle computing device(s) 204), one or more sensor systems 206, one or more emitters 208, one or more communication connections 210, at least one direct connection 212, and one or more drive systems 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle. In the illustrated example, the memory 218 of the vehicle computing device 204 stores a localization component 220, a perception component 222, one or more maps 224, one or more system controllers 226, a prediction component 228 comprising an image generation component 230, a machine learned component 232, an object interaction evaluation component 234 and a resource/priority allocation component 236 and a planning component 238. Though depicted in FIG. 2 as residing in memory 218 for illustrative purposes, it is contemplated that the localization component 220, the perception component 222, the one or more maps 224, the one or more system controllers 226, the prediction component 228, and the planning component 238 may additionally, or alternatively, be accessible to the vehicle 202 (e.g., stored remotely).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for generating or receiving map data, as discussed herein.

In some instances, the perception component 222 can include functionality to perform object detection, segmentation, and/or classification. In some examples, the perception component 222 can provide processed sensor data that indicates a presence of an object that is proximate to the vehicle 202 and/or a classification of the object as an object type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected object (e.g., a tracked object) and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

The memory 218 can further include one or more maps 224 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 224 can include at least one map (e.g., images and/or a mesh). In some examples, the vehicle 202 can be controlled based at least in part on the map(s) 224. That is, the map(s) 224 can be used in connection with the localization component 220, the perception component 222, the prediction component 228, and/or the planning component 238 to determine a location of the vehicle 202, identify objects in an environment, generate interaction probabilit(ies) for regions of the area surrounding the vehicle 202, and/or generate routes and/or trajectories to navigate within an environment.

In some examples, the one or more maps 224 can be stored on a remote computing device(s) (such as the computing device(s) 242) accessible via network(s) 240. In some examples, multiple maps 224 can be stored based on, for example, a characteristic (e.g., type of object, time of day, day of week, season of the year, etc.). Storing multiple maps 224 can have similar memory requirements, but increase the speed at which data in a map can be accessed.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

In general, the prediction component 228 can generate predicted trajectories of objects in an environment. For example, the prediction component 228 can generate one or more predicted trajectories for vehicles, pedestrians, animals, and the like within a threshold distance from the vehicle 202. In some instances, the prediction component 228 can measure a trace of an object and generate a trajectory for the object based on observed and predicted behavior.

In some examples, the image generation component 230 can include functionality to generate images representing a top-down view of a scene. Examples of such images generated by the image generation component 230 are shown in FIG. 1 as the examples 110 and 122.

In some examples, the image generation component 230 can generate an image representing an area around the vehicle 202. In some examples, the area can be based at least in part on an area visible to sensors (e.g., a sensor range), a receding horizon, an area associated with an action (e.g., traversing through an intersection), and the like. In some examples, the image may represent a 100 meter×100 meter area around the vehicle 202, although any area is contemplated. The image generation component 230 can receive data about objects in the environment from the perception component 222 and can receive data about the environment itself from the localization component 220, the perception component 222, and the one or more maps 224. The image generation component 230 can generate a top-down view of the environment including objects in the environment (e.g., represented by a bounding box, as discussed herein), semantic information about the object (e.g., a classification type), movement information (e.g., velocity information, acceleration information, etc.), and the like. The image generation component 230 can further generate image elements (e.g., symbols or other representations) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like.

The image(s) generated by the image generation component 230 can represent prior information about the state of the environment and objects in the environment that can be used to generate at interaction probabilit(ies), as discussed herein.

In any of the examples discussed herein, the image generation component 230 may generate an image having multiple channels, wherein each channel is representative of some information (semantic or otherwise).

In some examples, the machine learned component 232 (also referred to as a machine learned model component 232) can include functionality to receive the image(s) generated by the image generation component 230 and to generate one or more probability maps including interaction probabilities, as discussed herein.

In some instances, the machine learned component 232 can include one or more machine learned models trained to output one or more probability maps based on top-down images input into the model. In some examples, the machine learned component 232 can include a convolutional neural network (CNN), which may or may not include one or more recurrent neural network (RNN) layers, for example, long short-term memory (LSTM) layers.

In some examples, a probability map output by the machine learned component 232 can represent an area of the environment proximate to the autonomous vehicle. For example, the probability map can represent a 64×64 grid (or J×K sized grid) representing a 100 meter by 100 meter region around the autonomous vehicle. In some examples, an area represented by a probability map can correspond to the area represented by the images input to the machine learned component 232. Of course, the probability map can represent any size of area and can represent any number of discrete portions of the area. In some cases, a portion of the probability map can be referred to as a region of the probability map. Each region can comprise an interaction probability representing a probability of an object positioned in the region interacting with the autonomous vehicle (e.g., how likely the object is to be relevant to prediction and planning operations performed by the vehicle) and/or a classification of interaction. In some instances, the machine learned model can output a plurality of probability maps, wherein a probability map of the plurality of probability maps can represent probability predictions associated with the object at a particular time in the future (e.g., 0.5 second, 1 second, 3 seconds, 5 seconds, 10 seconds, etc.).

In some examples, the machine learned model may also output interaction classification(s) for regions of the probability map. As a non-limiting example, where the object continues ahead of the vehicle, such an object may be labeled (provided the classification of) a leading object. Other interaction classifications include, but are not limited to, lane change, stopping, crossing intersection, slowing down, reversing, pulling out (e.g., from a parking lane/spot), or the like.

In some examples, the probability map(s) may be heat maps. A heat map may be a probability map over the represented area in which the regions are approximately or substantially scaled to a pixel (or an L×M grid of pixels) of the top-down image(s). As such, each pixel (e.g., or L×M grid of pixels) of the heat map may correspond to a respective pixel (e.g., or L×M grid of pixels) in the top-down image(s). Each pixel can comprise an interaction probability representing a probability that an object at the location in the environment corresponding to the pixel will interact with the vehicle.

In some examples, the machine learned component 232 can be trained to generate any number of probability maps based on any number of input images. For example, the machine learned component 232 can receive N number of input images and can output 0 number of probability maps.

In some examples, the object interaction evaluation component 234 may determine interaction probabilities for objects based on the interaction probabilities of regions in which the objects are positioned. For example, the object interaction evaluation component 234 may determine the position of a centroid of, for example, an object in the area around the vehicle. Then, the object interaction evaluation component 234 may determine the region of the area that includes the position of the centroid of the object. The object interaction evaluation component 234 may then assign the interaction probability of the determined region to the object or otherwise determine an object interaction probability for the object based on the interaction probability of the determined region. Additionally or alternatively, a combination of interaction probabilities associated with one or more regions the object resides in may be used to calculate an aggregate interaction probability for the object (e.g., as a weighted average or sum that is weighted by a portion of the object overlapping the regions). Other variations on assignment of an interaction probability to objects based on the regions associated with objects by location are contemplated. In examples in which the machine learned model outputs interaction classification(s) for regions of the probability map, the object interaction evaluation component 234 may assign the interaction classification of the determined region(s) to the object.

The resource/priority allocation component 236 may utilize the interaction probabilities and/or interaction classifications assigned to the objects to more efficiently (e.g., more quickly and/or with reduced computing resources) predict object behaviors, model vehicle planning, and/or generate vehicle controls. For example, additional or reduced processing resources may be assigned to, or priority of assignment thereof may be determined for, objects. Additionally or alternative, a determination of which analyses to perform for objects may be based at least in part on the interaction probabilities. As a non-limiting example, if the probability of interaction is equal to or greater than a threshold probability, the resource/priority allocation component 236 may allocate resources for planning in consideration of the object, whereas if the probability is at or below the threshold, the object may be disregarded for planning purposes.

In general, the planning component 238 can determine a path for the vehicle 202 to follow to traverse through an environment based at least in part on the interaction probabilities (e.g., directly or indirectly). In some examples, the planning component 238 may perform planning without considering or with minimal consideration of objects with interaction probabilities below a threshold. Additionally or alternatively, the planning may be indirectly impacted, such as due to how processing resources were allocated for prediction and/or which analyses were performed for which objects.

In some instances, aspects of some or all of the components discussed herein can include any models, algorithms, and/or machine learning algorithms. For example, in some instances, the components in the memory 218 (and the memory 246, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learned can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 206 can include multiple instances of each of these or other types of sensors. For instance, the lidar sensors can include individual lidar sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 240, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 240. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive systems 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In some examples, the vehicle 202 can send sensor data to one or more computing device(s) 242 via the network(s) 240. In some examples, the vehicle 202 can send raw sensor data to the computing device(s) 242. In other examples, the vehicle 202 can send processed sensor data and/or representations of sensor data to the computing device(s) 242. In some examples, the vehicle 202 can send sensor data to the computing device(s) 242 at a particular frequency, after a lapse of a predetermined period of time, in near real-time, etc. In some cases, the vehicle 202 can send sensor data (raw or processed) to the computing device(s) 242 as one or more log files.

The computing device(s) 242 can include processor(s) 244 and a memory 246 storing a training component 248.

In some instances, the training component 248 can include functionality to train a machine learned model to output one or more probability maps including interaction probabilities for regions of an environment. For example, the training component 248 can receive a set of images representing a top-down view of an environment. In some cases, the set of images can represent an area around a vehicle or object as it traverses through an environment for a period of time, such as 5 seconds, 7 seconds, 10 seconds, 20 seconds, and the like. At least a portion of the set of images can be used as an input to train the machine learned model. Using the probability map output by the machine learned model being trained, interaction probabilities may be assigned to objects in the training data. The interaction probabilities may be compared to ground truth data to determine a loss.

In some examples, ground truth data may indicate that an object is an interacting object when the object and the vehicle occupy the same spatial position (e.g., within a threshold distance) within a threshold time period. In particular, an example may determine a ground truth interaction exists for an object where the vehicle occupies a position noted by coordinates $(x_0, y_0)$ in the environment at time $t_0$ and the object occupies a position noted by coordinates $(x_1, y_1)$ where $x_1=x_0 \pm 1$ meter and $y_1=y_0 \pm 1$ meter at time $t_1$ where $t_1=t_0 \pm 8$ seconds. Stated differently, the ground truth may indicate a ground truth interaction exists when the object occupies a location at a time within one meter of a position occupied by the vehicle within a time period from eight seconds before the time to eight seconds after the time. Depending on the example, the ground truth interaction data may be a yes or no type value or may have more than two possible values. For examples, the ground truth interaction data for an object may be determined based on how close in time and position the interaction occurred (e.g., an object that crossed the same position three seconds earlier than the vehicle may have a higher ground truth interaction than an object crossing 0.5 meters away from the vehicle's path at a time five seconds later). A loss may be determined based on the agreement or disagreement between the interaction probabilities assigned to the objects and the ground truth interactions. This loss may then be backpropagated to train the machine learned model.

In examples in which the machine learned model may output interaction classification(s) for objects associated with the regions, ground truth data used in training the machine learned model may include interaction classification(s) (e.g., based determined based on observed behavior in log data (whether of real or simulated data). In training, a loss may be determined based on the agreement or disagreement between the interaction classifications assigned to the objects and the ground truth data. Losses associated with the classifications may comprise a cross-entropy loss, though any other loss is contemplated.

In some examples, the training component 248 can include training data that has been generated by a simulator. For example, simulated training data can represent examples where a vehicle collides with an object in an environment or nearly collides with an object in an environment, to provide additional training examples.

Additional details of the training component 248 are discussed below in connection with FIG. 2B, as well as throughout this disclosure.

The processor(s) 216 of the vehicle 202 and the processor(s) 244 of the computing device(s) 242 can be any suitable processor capable of executing instructions to process data and perform operations as described herein. By way of example and not limitation, the processor(s) 216 and 244 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 246 are examples of non-transitory computer-readable media. The memory 218 and 246 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 and 246 can include at least a working memory and a storage memory. For example, the working memory may be a high-speed memory of limited capacity (e.g., cache memory) that is used for storing data to be operated on by the processor(s) 216 and 244. In some instances, the memory 218 and 246 can include a storage memory that may be a lower-speed memory of relatively large capacity that is used for long-term storage of data. In some cases, the processor(s) 216 and 244 cannot operate directly on data that is stored in the storage memory, and data may need to be loaded into a working memory for performing operations based on the data, as discussed herein.

It should be noted that while FIG. 2 is illustrated as a distributed system, in alternative examples, components of the vehicle 202 can be associated with the computing device(s) 242 and/or components of the computing device(s) 242 can be associated with the vehicle 202. That is, the vehicle 202 can perform one or more of the functions associated with the computing device(s) 242, and vice versa.

Figure 2B:
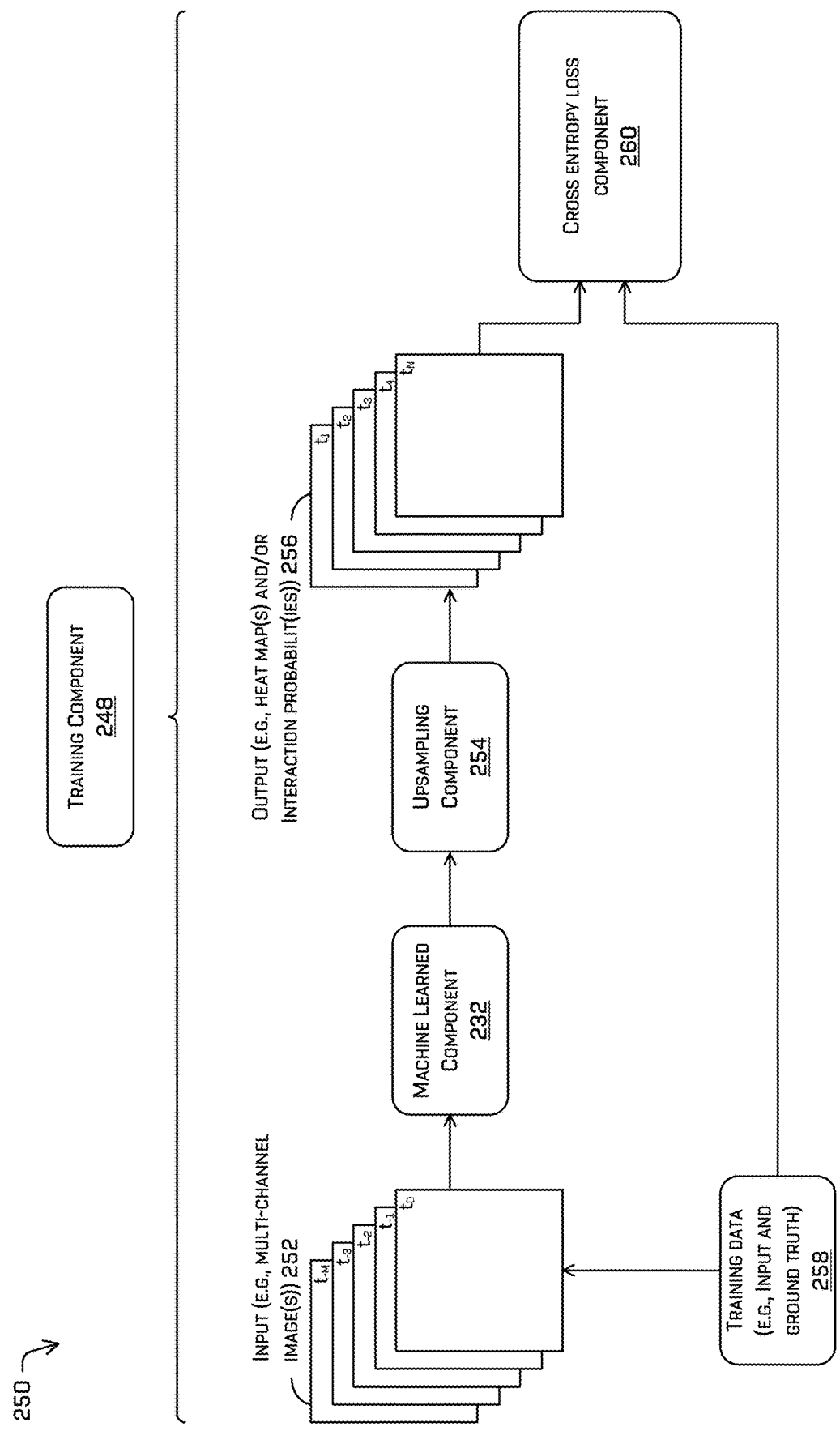
FIG. 2B depicts a block diagram of an example training component for training a machine learned model to implement the techniques described herein, in accordance with embodiments of the disclosure.

FIG. 2B depicts a block diagram 250 of an example training component 248 for training a machine learned model to implement the techniques described herein.

In some examples, training data 258 can comprise data captured by a vehicle as it traverses through an environment. Additionally or alternatively, the training data 258 may comprise a set of images representing a top-down view of the environment based on the data captured by the vehicle as it traversed through the environment. In some examples, an input 252 can be based at least in part on the training data 258.

The input 252 may comprise one or more multi-channel images and can be input to the machine learned component 232. In some examples, the machine learned component 232 can comprise a ResNet architecture. In some examples, the machine learned component 232 can comprise the ResNet architecture as a base backbone.

In some examples, an output feature map can be passed through a 1×1 convolution to obtain the final channel dimension, which can be bilinearly upsampled (e.g., via an upsampling component 254) to match an input resolution, which is represented as an output 256 (e.g., heat maps and/or interaction probabilit(ies)).

In some examples, the output logits from the machine learned component 232 can be compared against training data 258 (e.g., ground truth representing ground truth interactions) using a binary cross entropy loss.

A cross entropy loss component 260 can include functionality to compare the output logits against the training data 258 and to determine loss based thereon. other losses may be used (e.g., L1, L2). As mentioned above, this loss may be backpropagated to train the machine learned component 232.

Figure 3:
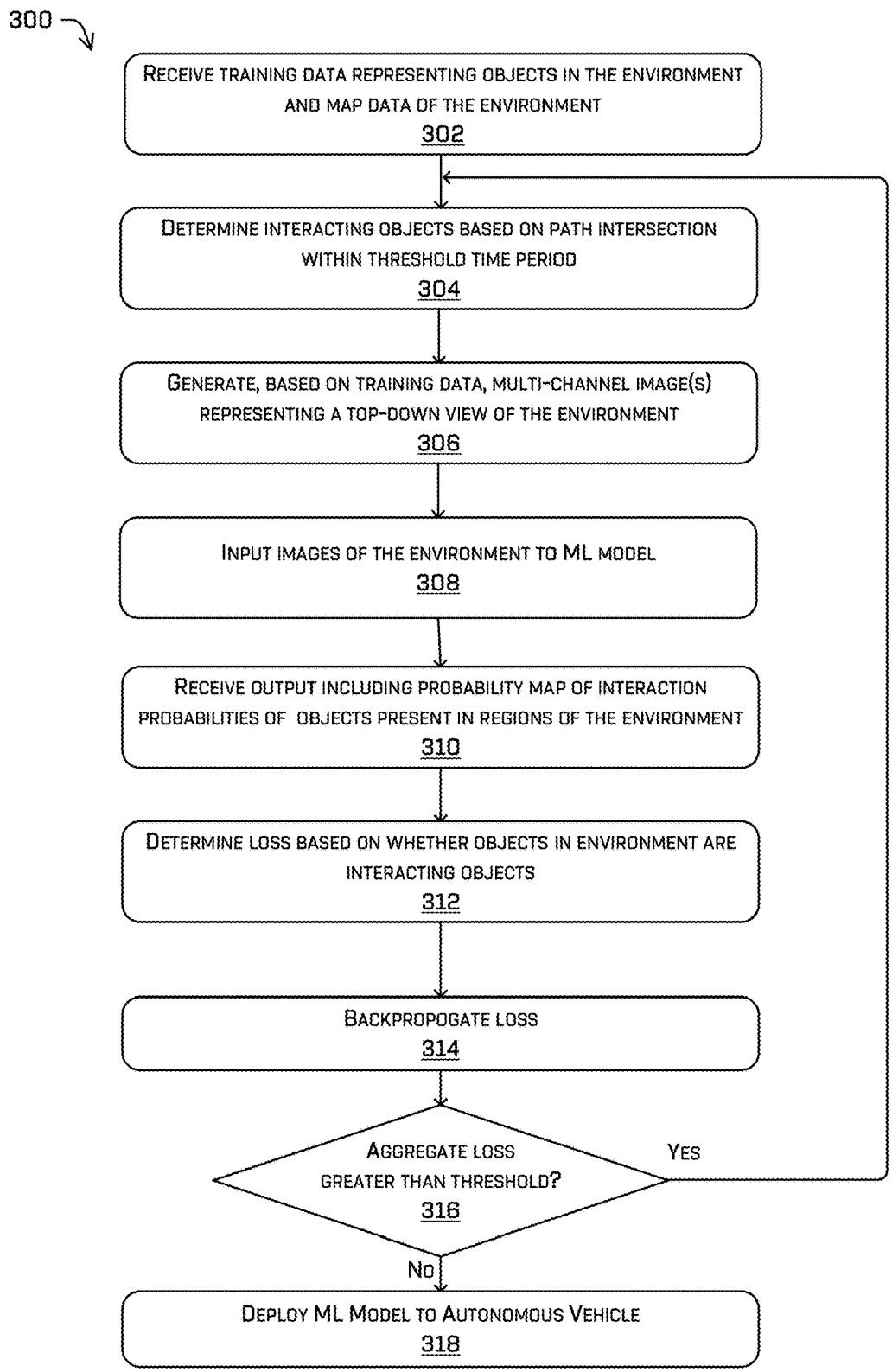
FIG. 3 depicts an example process for training a machine learned model to output a probability map associated with interaction probabilities for regions of an environment, in accordance with embodiments of the disclosure.
Figure 4:
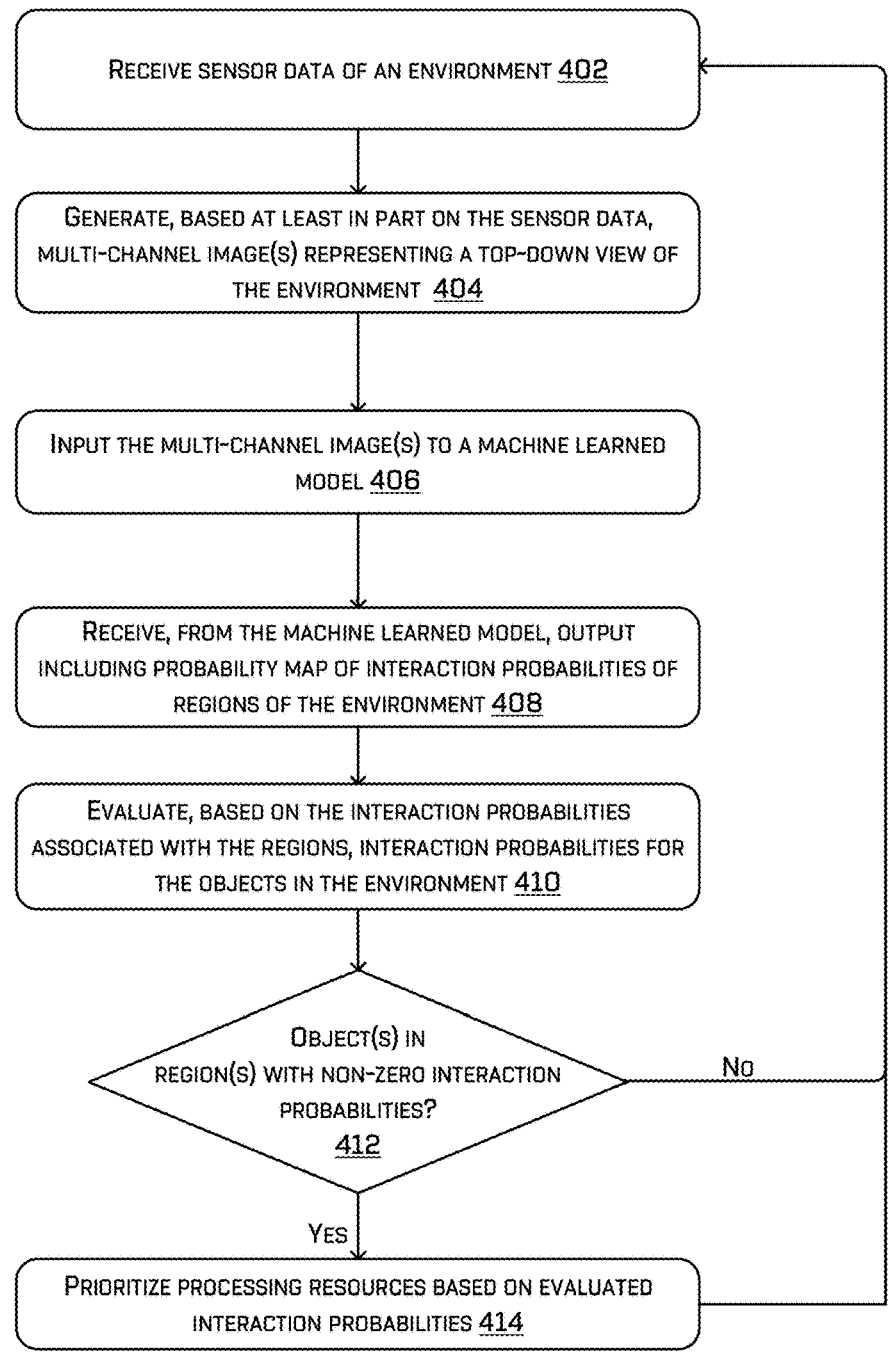
FIG. 4 depicts an example process for generating and utilizing a probability map associated with interaction probabilities for regions of an environment, in accordance with embodiments of the disclosure.

FIGS. 3 and 4 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 3 depicts an example process 300 for training a machine learned model to output a probability map associated with interaction probabilities for regions of an environment, in accordance with embodiments of the disclosure. For example, some or all of the process 300 can be performed by one or more components in FIG. 2, as described herein. For example, some or all of the process 300 can be performed by the vehicle computing device(s) 204 and/or the computing device(s) 242.

At operation 302, the process can include receiving training data representing objects in the environment and/or map data of the environment (e.g., over a period of time). At operation 304, the process can include determining one or more interacting objects in the training data based on path intersection occurring within a threshold time period. In some examples, the operation 304 may determine ground truth data. In some examples, ground truth data may indicate that an object is an interacting object when the object and the vehicle occupy the same spatial position (e.g., within a threshold distance) within a threshold time period. In particular, an example may determine a ground truth interaction exists for an object where the vehicle occupies a position noted by coordinates $(x_0, y_0)$ in the environment at time $t_0$ and the object occupies a position noted by coordinates $(x_1, y_1)$ where $x_1=x_0 \pm 1$ meter and $y_1=y_0 \pm 1$ meter at time $t_1$ where $t_1=t_0 \pm 8$ seconds.

Stated differently, the ground truth may indicate a ground truth interaction exists when the object occupies a location at a time within one meter of a position occupied by the vehicle within a time period from eight seconds before the time $t_0$ eight seconds after the time. Depending on the example, the ground truth interaction data may be a yes or no type value or may have more than two possible values. For examples, the ground truth interaction data for an object may be determined based on how close in time and position the interaction occurred (e.g., an object that crossed the same position three seconds earlier than the vehicle may have a higher ground truth interaction than an object crossing 0.5 meters away from the vehicle's path at a time five seconds later).

At operation 306, the process can include generating, based on the training data, multi-channel image(s) representing a top-down view of the environment the object data and map data of the environment to ML model. For example, the operation 306 can include generating a top-down view of the environment including objects in the environment (e.g., represented by a bounding box, as discussed herein), semantic information about the object (e.g., a classification type), movement information (e.g., velocity information, acceleration information, etc.), and the like. The process may further generate image elements (e.g., symbols or other representations) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like. The image(s) generated at operation 306 may represent prior information about the state of the environment and objects in the environment that can be used to generate at interaction probabilit(ies), as discussed herein.

At operation 308, the process can include inputting the images of the environment into ML model. At 310, the process can include receiving, from the machine learned model, output including a probability map of interaction probabilities of object(s) present in regions of the environment. Examples of probability maps associated with interaction probabilities are discussed above in connection with FIGS. 1 and 2, as well as throughout this disclosure.

At operation 312, the process can include determining a loss based on whether objects in environment are interacting objects. In some examples, the operation 312 can include using the probability map output by the machine learned model being trained and the ground truth interaction probabilities assigned to objects at 304. In some examples, the interaction probabilities may be compared to ground truth data to determine a loss. In some examples, using the probability map output by the machine learned model, interaction probabilities may be assigned to objects in the training data. The interaction probabilities may be compared to ground truth data determined at 304 to determine a loss.

As discussed above, the ground truth data determined at 304 may indicate that an object is an interacting object when the object and the vehicle occupy the same spatial position (e.g., within a threshold distance) within a threshold time period. Depending on the example, the ground truth interaction data may be a yes or no type value or may have more than two possible values. For examples, the ground truth interaction data for an object may be determined based on how close in time and position the interaction occurred (e.g., an object that crossed the same position three seconds earlier than the vehicle may have a higher ground truth interaction than an object crossing 0.5 meters away from the vehicle's path at a time five seconds later).

A loss may be determined based on the agreement or disagreement between the interaction probabilities assigned to the objects and the ground truth interactions. For example, the output from the machine learned model may be compared against ground truth interactions determined at 304 using a binary cross entropy loss. At operation 314, the process may include backpropagating the loss to train the machine learned model.

At operation 316, the process can include determining whether an aggregate loss over a number of iterations is greater than or equal to a threshold. If not (e.g., "no" in the operation 316), at operation 318, the machine learned model may be output to an autonomous vehicle for operation. Returning to the operation 316, if the aggregate loss over a number of iterations is greater than the threshold (e.g., "yes" in the operation 316), the process may move to operation 304 for processing of another iteration.

FIG. 4 depicts an example process 400 for generating and utilizing a probability map associated with interaction probabilities for regions of an environment, in accordance with embodiments of the disclosure. For example, some or all of the process 400 can be performed by one or more components in FIG. 2, as described herein. For example, some or all of the process 400 can be performed by the vehicle computing device(s) 204 and/or the computing device(s) 242.

At operation 402, the process can include capturing sensor data of an environment. At operation 404, the process can include generating, based at least in part on the sensor data, multi-channel image(s) representing a top-down view of the environment. A discussion of generating multi-channel images is provided above regarding FIGS. 1-3.

At operation 406, the process can include inputting the images of the environment into ML model. At 408, the process can include receiving, from the machine learned model, output including a probability map of interaction probabilities of regions of the environment. Examples of probability maps associated with interaction probabilities are discussed above in connection with FIGS. 1 and 2, as well as throughout this disclosure.

At operation 410, the process can include evaluating, based on the interaction probabilities associated with the regions, the interaction probabilities for the object(s) in the environment. In some examples, the operation 410 can include, using the probability map output by the machine learned model, assigning interaction probabilities to objects in the top down view. A discussion of assigning interaction probabilities to objects based on probability maps is provided above regarding FIGS. 1-3.

At operation 412, the process can include determining whether objects in the sensor data were assigned a non-zero interaction probability and/or objects associated with a probability of interaction equal to or greater than some threshold probability of interaction. If so (e.g., "yes" in the operation 410), at operation 414, the process may include prioritizing processing resources based on the evaluated interaction probabilities. A discussion of prioritizing processing resources and other operations based on interaction probabilities of objects is provided above regarding FIGS. 1-3. Returning to operation 412, if the objects in the sensor data were assigned a zero interaction probability (e.g., "no" in the operation 410), the process may move to operation 402 for processing of additional sensor data.

Though FIGS. 3 and 4 illustrate processes by which a machine learned model may be trained and/or utilized to output interaction probabilities, in some examples according to FIGS. 3 and 4, interaction classifications may be output by the machine learned model and utilized as discussed above with regard to FIGS. 1 and 2.

Example Clauses

A: A system comprising: one or more processors; and one or more computer-readable media storing instructions executable by the one or more processors, wherein the instructions, when executed, cause the system to perform operations comprising: receiving training data representing an environment associated with a vehicle and map data of the environment; determining, based on the training data, ground truth data indicating an object in the environment is an interacting object; generating, based on the training data and the map data, a top-down multi-channel image representing a top-down view of the environment; inputting the top-down multi-channel image into a machine learned (ML) model; receiving, from the ML model and based on the top-down multi-channel image, a probability map comprising a region and an interaction probability associated with the region that indicates, for objects positioned at the region, a probability the objects will interact with the vehicle; determining the region is associated with a position of the object; determining, based at least in part on the determining the region is associated with the position of the object, an object interaction probability of the object based on the interaction probability; determining a loss based at least in part on the ground truth data and the object interaction probability of the object; altering, as a trained ML model, one or more parameters of the ML model to reduce the loss; and transmitting the trained ML model to an autonomous vehicle.

B. The system of claim A, wherein the determining of the ground truth data indicating the object is an interacting object comprises: determining the object was within a threshold distance of the vehicle within a threshold time period.

C. The system of claim A, wherein: the top-down multi-channel image and the probability map represent an area of the environment around the vehicle at a first time; and inputting the top-down multi-channel image into a machine learned model comprises inputting an additional top-down multi-channel image to the ML model with the top-down multi-channel image, the additional top-down multi-channel image representing the vehicle at a second time.

D. The system of claim A, wherein the autonomous vehicle is configured to be controlled based at least in part on an output of the trained ML model.

E. The system of claim A, wherein the operations further comprise determining an interaction classification associated with the object, the object classification comprising one or more of: a lane change interaction, a leading interaction, or a crossing interaction.

F. A method comprising: receiving sensor data of an environment from a sensor associated with a vehicle; generating, based at least in part on the sensor data, a top-down multi-channel image representing a top down view of the environment; inputting the top-down multi-channel image to a machine learned (ML) model; receiving, from the ML model, a probability map, a portion of the probability map associated with a region of the environment and comprising an interaction probability indicative of a likelihood that an object associated with the region will interact with the vehicle; determining, based at least in part on the determining the region is associated with the position of the object, an object interaction probability of the object based on the interaction probability; and determining, based at least in part on the object interaction probability, an action for the vehicle to perform.

G. The method of claim F, wherein: the top-down multi-channel image and the probability map represent an area of the environment proximate the vehicle, the area comprising the region at a time; and inputting the top-down multi-channel image into the ML model comprises inputting another top-down multi-channel image to the ML model with the top-down multi-channel image, the other top-down multi-channel image representing another area around the vehicle at another time prior to the time.

H. The method of claim F, wherein determining the action comprises: determining, based at least in part on the object interaction probability, a priority for resource assignment for an analysis of the object; and controlling the vehicle based at least in part on the analysis of the object.

I. The method of claim H, wherein the analysis comprises determining a behavior associated with the object based at least in part on one or more of: following logic associated with the object; leading logic associated with the object; lane change logic associated with the object; or performing active prediction for the object.

J. The method of claim F, wherein: an additional portion of the probability map defines an additional region and comprises an additional interaction probability, the sensor data includes data associated with an additional object associated with the additional region, and 9 the method further comprises: determining, based at least in part on the additional object interaction probability being less than or equal to a threshold probability, a lower priority for resource assignment associated with the additional object.

K. The method of claim F, wherein the region further comprises a classification associated with a type of interaction, the classification comprising one or more of:
a lane change interaction, a leading interaction, or a crossing intersection interaction.

L. The method of claim F, wherein the ML model comprises a single pixel convolution and an upsampling, and wherein an output of the ML model comprises a same resolution as data input into the ML model.

M. The method of claim F, wherein the ML model is trained to output the probability map based on ground truth data including a ground truth interaction between a ground truth vehicle and a ground truth object, the ground truth interaction comprising one of: the ground truth object occupying a spatial position within a threshold position of the ground truth vehicle within a threshold time period; or the ground truth object changing from or to a lane occupied by the ground truth vehicle.

N. The method of claim M, wherein the ML model is further trained based at least in part on an interaction classification associated with the ground truth object.

O. One or more non-transitory computer-readable media storing instructions that, when executed, cause one or more processors to perform operations comprising: receiving sensor data of an environment from a sensor associated with a vehicle; generating, based at least in part on the sensor data, a top-down multi-channel image representing a top down view of the environment; inputting the top-down multi-channel image to a machine learned (ML) model; receiving, from the ML model, a probability map, a portion of the probability map comprising a region and an interaction probability associated with the region that indicates a likelihood that an object positioned at the region will interact with the vehicle; determining an object interaction probability of the object based on the probability map; and controlling the vehicle based at least in part on the object interaction probability, wherein the interaction is indicative of the object and the vehicle being within a threshold distance of an object over a period of time.

P. The one or more non-transitory computer-readable media of claim O, wherein controlling the vehicle comprises: determining, based at least in part on the object interaction probability, a priority for resource assignment associated with an analysis of the object; and determining an action for the vehicle to perform based on the analysis.

Q. The one or more non-transitory computer-readable media of claim P, wherein: the analysis comprises determining a behavior associated with the object based at least in part on one or more of: following logic associated with the object;

leading logic associated with the object; lane change logic associated with the object; or performing active prediction for the object.

R. The one or more non-transitory computer-readable media of claim O, wherein an additional portion of the probability map defines an additional region and comprises an additional interaction probability, the sensor data includes data associated with an additional object associated with the additional region, and the method further comprises: determining, based at least in part on the additional object interaction probability being less than or equal to a threshold probability, a lower priority for resource assignment associated with the additional object.

S. The one or more non-transitory computer-readable media of claim O, wherein: the top-down multi-channel image and the probability map represent an area of the environment proximate the vehicle, the area comprising the region at a time; and inputting the top-down multi-channel image into the ML model comprises inputting another top-down multi-channel image to the ML model with the top-down multi-channel image, the other top-down multi-channel image representing another area around the vehicle at another time prior to the time.

T. The one or more non-transitory computer-readable media of claim O, wherein the region further comprises a classification associated with a type of interaction, the classification comprising one or more of: a lane change interaction, a leading interaction, or a crossing intersection interaction.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving training data representing an environment associated with a vehicle and map data of the environment;
determining, based on the training data, ground truth data comprising an indication that an object in the environment is an interacting or non-interacting object, wherein the indication further comprises an interaction parameter based at least in part on an interaction time and an interaction distance;
assigning a weight to a portion of the training data based at least in part on the indication;
generating, based on the training data, the weight, and the map data, a top-down multi-channel image representing a top-down view of the environment;
inputting the top-down multi-channel image into a machine learned (ML) model;
receiving, from the ML model and based on the top-down multi-channel image, a probability map comprising a region and an interaction probability associated with the region that indicates, for objects positioned at the region, a probability the objects will interact with the vehicle, wherein the probability is independent of a trajectory prediction associated with the vehicle;
determining the region is associated with a position of the object;
determining, based at least in part on the determining the region is associated with the position of the object, an object interaction probability of the object
based on the interaction probability;
determining a loss based at least in part on the ground
truth data and the object interaction probability of the
object;
altering, as a trained ML model, one or more parameters of the ML model to reduce the loss; and
transmitting the trained ML model to an autonomous
vehicle.

2. The system of claim 1, wherein the determining of the ground truth data indicating the object is an interacting object comprises:
determining the object was within a threshold distance of the vehicle within a threshold time period.

3. The system of claim 1, wherein:
the top-down multi-channel image and the probability map represent an area of the environment around the vehicle at a first time; and
inputting the top-down multi-channel image into a machine learned model comprises inputting an additional top-down multi-channel image to the ML model with the top-down multi-channel image, the additional top-down multi-channel image representing the vehicle at a second time.

4. The system of claim 1, wherein the autonomous vehicle is configured to be controlled based at least in part on an output of the trained ML model.

5. The system of claim 1, wherein the operations further comprise determining an interaction classification associated with the object, the interaction classification comprising one or more of:
a lane change interaction,
a leading interaction, or
a crossing interaction.

6. A method comprising:
receiving sensor data of an environment from a sensor associated with a vehicle;
generating, based at least in part on the sensor data, a top-down multi-channel image representing a top-down view of the environment;
inputting the top-down multi-channel image to a machine learned (ML) model;
receiving, from the ML model, a probability map, a portion of the probability map associated with a region of the environment and comprising an interaction probability indicative of a likelihood that an object associated with the region will interact with the vehicle, wherein the probability is independent of a trajectory prediction associated with the vehicle;
determining, based at least in part on the determining the region is associated with a position of the object, an object interaction probability of the object based on the interaction probability; and
determining, based at least in part on the object interaction probability, an action for the vehicle to perform.

7. The method of claim 6, wherein:
the top-down multi-channel image and the probability map represent an area of the environment proximate the vehicle, the area comprising the region at a time; and
inputting the top-down multi-channel image into the ML model comprises inputting another top-down multi-channel image to the ML model with the top-down multi-channel image, the another top-down multi-channel image representing another area around the vehicle at another time prior to the time.

8. The method of claim 6, wherein determining the action comprises:
determining, based at least in part on the object interaction probability, a priority for resource assignment for an analysis of the object; and
controlling the vehicle based at least in part on the analysis of the object.

9. The method of claim 8, wherein the analysis comprises determining a behavior associated with the object based at least in part on one or more of:
following logic associated with the object;
leading logic associated with the object;
lane change logic associated with the object; or
performing active prediction for the object.

10. The method of claim 6, wherein:
an additional portion of the probability map defines an additional region and comprises an additional interaction probability,
the sensor data includes data associated with an additional object associated with the additional region, and
the method further comprises:
determining, based at least in part on the additional interaction probability being less than or equal to a threshold probability, a lower priority for resource assignment associated with the additional object.

11. The method of claim 6, wherein the region further comprises a classification associated with a type of interaction, the classification comprising one or more of:
a lane change interaction,
a leading interaction, or
a crossing intersection interaction.

12. The method of claim 6, wherein the ML model comprises a single pixel convolution and an upsampling, and
wherein an output of the ML model comprises a same resolution as data input into the ML model.

13. The method of claim 6, wherein the ML model is trained to output the probability map based on ground truth data including a ground truth interaction between a ground truth vehicle and a ground truth object, the ground truth interaction comprising one of:
the ground truth object occupying a spatial position within a threshold position of the ground truth vehicle within a threshold time period; or
the ground truth object changing from or to a lane occupied by the ground truth vehicle.

14. The method of claim 13, wherein the ML model is further trained based at least in part on an interaction classification associated with the ground truth object.

15. One or more non-transitory computer-readable media storing instructions that, when executed, cause one or more processors to perform operations comprising:
receiving sensor data of an environment from a sensor associated with a vehicle;
generating, based at least in part on the sensor data, a top-down multi-channel image representing a top-down view of the environment;
inputting the top-down multi-channel image to a machine learned (ML) model;
receiving, from the ML model, a probability map, a portion of the probability map comprising a region and an interaction probability associated with the region that indicates a likelihood that an object positioned at the region will interact with the vehicle, wherein the probability is independent of a trajectory prediction associated with the vehicle;
determining an object interaction probability of the object based on the probability map; and controlling the vehicle based at least in part on the object interaction probability,
wherein the interaction is indicative of the object and the vehicle being within a threshold distance of an object over a period of time.

16. The one or more non-transitory computer-readable media of claim 15, wherein controlling the vehicle comprises:
   determining, based at least in part on the object interaction probability, a priority for resource assignment associated with an analysis of the object; and
   determining an action for the vehicle to perform based on the analysis.

17. The one or more non-transitory computer-readable media of claim 16, wherein:
   the analysis comprises determining a behavior associated with the object based at least in part on one or more of:
   following logic associated with the object;
   leading logic associated with the object;
   lane change logic associated with the object; or
   performing active prediction for the object.

18. The one or more non-transitory computer-readable media of claim 16, wherein an additional portion of the probability map defines an additional region and comprises an additional interaction probability, the sensor data includes data associated with an additional object associated with the additional region, and
   the operations further comprising: determining, based at least in part on the additional object interaction probability being less than or equal to a threshold probability, a lower priority for resource assignment associated with the additional object.

19. The one or more non-transitory computer-readable media of claim 15, wherein:
   the top-down multi-channel image and the probability map represent an area of the environment proximate the vehicle, the area comprising the region at a time; and
   inputting the top-down multi-channel image into the ML model comprises inputting another top-down multi-channel image to the ML model with the top-down multi-channel image, the another top-down multi-channel image representing another area around the vehicle at another time prior to the time.

20. The one or more non-transitory computer-readable media of claim 15, wherein the region further comprises a classification associated with a type of interaction, the classification comprising one or more of:
   a lane change interaction,
   a leading interaction, or
   a crossing intersection interaction.

* * * * *